(12) United States Patent
Abotabl et al.

(10) Patent No.: US 11,716,689 B2
(45) Date of Patent: Aug. 1, 2023

(54) ENERGY HARVESTING BASED ON PRE-EMPTION INDICATIONS

(71) Applicant: QUALCOMM Incorporated, San Diego, CA (US)

(72) Inventors: Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/452,758

(22) Filed: Oct. 28, 2021

(65) Prior Publication Data
US 2023/0140778 A1  May 4, 2023

(51) Int. Cl.
*H04W 52/02* (2009.01)
*H04W 72/1273* (2023.01)
*H04W 72/51* (2023.01)

(52) U.S. Cl.
CPC ...  *H04W 52/0296* (2013.01); *H04W 52/0216* (2013.01); *H04W 72/1273* (2013.01); *H04W 72/51* (2023.01)

(58) Field of Classification Search
None
See application file for complete search history.

(56) References Cited

U.S. PATENT DOCUMENTS

2014/0011543 A1* 1/2014 Li ............... H04W 52/0206 455/561
2022/0346022 A1* 10/2022 Butt ............ H04W 52/0251

FOREIGN PATENT DOCUMENTS

| WO | WO-2020131834 A1 * | 6/2020 | ............ H02J 50/001 |
| WO | WO-2020236664 A1 * | 11/2020 | ............ H02J 50/001 |
| WO | WO-2022265565 A1 * | 12/2022 | |
| WO | WO-2022265567 A1 * | 12/2022 | |

* cited by examiner

*Primary Examiner* — Alex Skripnikov
(74) *Attorney, Agent, or Firm* — Qualcomm Incorporated

(57) ABSTRACT

Various aspects of the present disclosure generally relate to wireless communication. In some aspects, a user equipment (UE) may receive, from a base station, a pre-emption indication associated with a scheduled transmission between the base station and the UE. Accordingly, the UE may perform energy harvesting, during the scheduled transmission, based at least in part on the pre-emption indication. Numerous other aspects are described.

30 Claims, 11 Drawing Sheets

ENERGY HARVESTING BASED ON PRE-EMPTION INDICATIONS

FIELD OF THE DISCLOSURE

Aspects of the present disclosure generally relate to wireless communication and to techniques and apparatuses for energy harvesting based on pre-emption indications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, a pre-emption indication associated with a scheduled transmission between the base station and the UE. The method may further include performing energy harvesting, during the scheduled transmission, based at least in part on the pre-emption indication.

Some aspects described herein relate to a method of wireless communication performed by a base station. The method may include determining that a UE should perform energy harvesting during a scheduled transmission between the base station and the UE. The method may further include transmitting, to the UE, a pre-emption indication, associated with the scheduled transmission between the base station and the UE, to trigger the UE to perform energy harvesting during the scheduled transmission.

Some aspects described herein relate to an apparatus for wireless communication at a UE. The apparatus may include a memory and one or more processors coupled to the memory. The one or more processors may be configured to receive, from a base station, a pre-emption indication associated with a scheduled transmission between the base station and the UE. The one or more processors may be further configured to perform energy harvesting, during the scheduled transmission, based at least in part on the pre-emption indication.

Some aspects described herein relate to an apparatus for wireless communication at a base station. The apparatus may include a memory and one or more processors coupled to the memory. The one or more processors may be configured to determine that a UE should perform energy harvesting during a scheduled transmission between the base station and the UE. The one or more processors may be further configured to transmit, to the UE, a pre-emption indication, associated with the scheduled transmission between the base station and the UE, to trigger the UE to perform energy harvesting during the scheduled transmission.

Some aspects described herein relate to a non-transitory computer-readable medium that stores a set of instructions for wireless communication by a UE. The set of instructions, when executed by one or more processors of the UE, may cause the UE to receive, from a base station, a pre-emption indication associated with a scheduled transmission between the base station and the UE. The set of instructions, when executed by one or more processors of the UE, may further cause the UE to perform energy harvesting, during the scheduled transmission, based at least in part on the pre-emption indication.

Some aspects described herein relate to a non-transitory computer-readable medium that stores a set of instructions for wireless communication by a base station. The set of instructions, when executed by one or more processors of the base station, may cause the base station to determine that a UE should perform energy harvesting during a scheduled transmission between the base station and the UE. The set of instructions, when executed by one or more processors of the base station, may further cause the base station to transmit, to the UE, a pre-emption indication, associated with the scheduled transmission between the base station and the UE, to trigger the UE to perform energy harvesting during the scheduled transmission.

Some aspects described herein relate to an apparatus for wireless communication. The apparatus may include means for receiving, from a base station, a pre-emption indication associated with a scheduled transmission between the base station and the apparatus. The apparatus may further include means for performing energy harvesting, during the scheduled transmission, based at least in part on the pre-emption indication.

Some aspects described herein relate to an apparatus for wireless communication. The apparatus may include means for determining that a UE should perform energy harvesting during a scheduled transmission between the apparatus and the UE. The apparatus may further include means for transmitting, to the UE, a pre-emption indication, associated with the scheduled transmission between the apparatus and the UE, to trigger the UE to perform energy harvesting during the scheduled transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
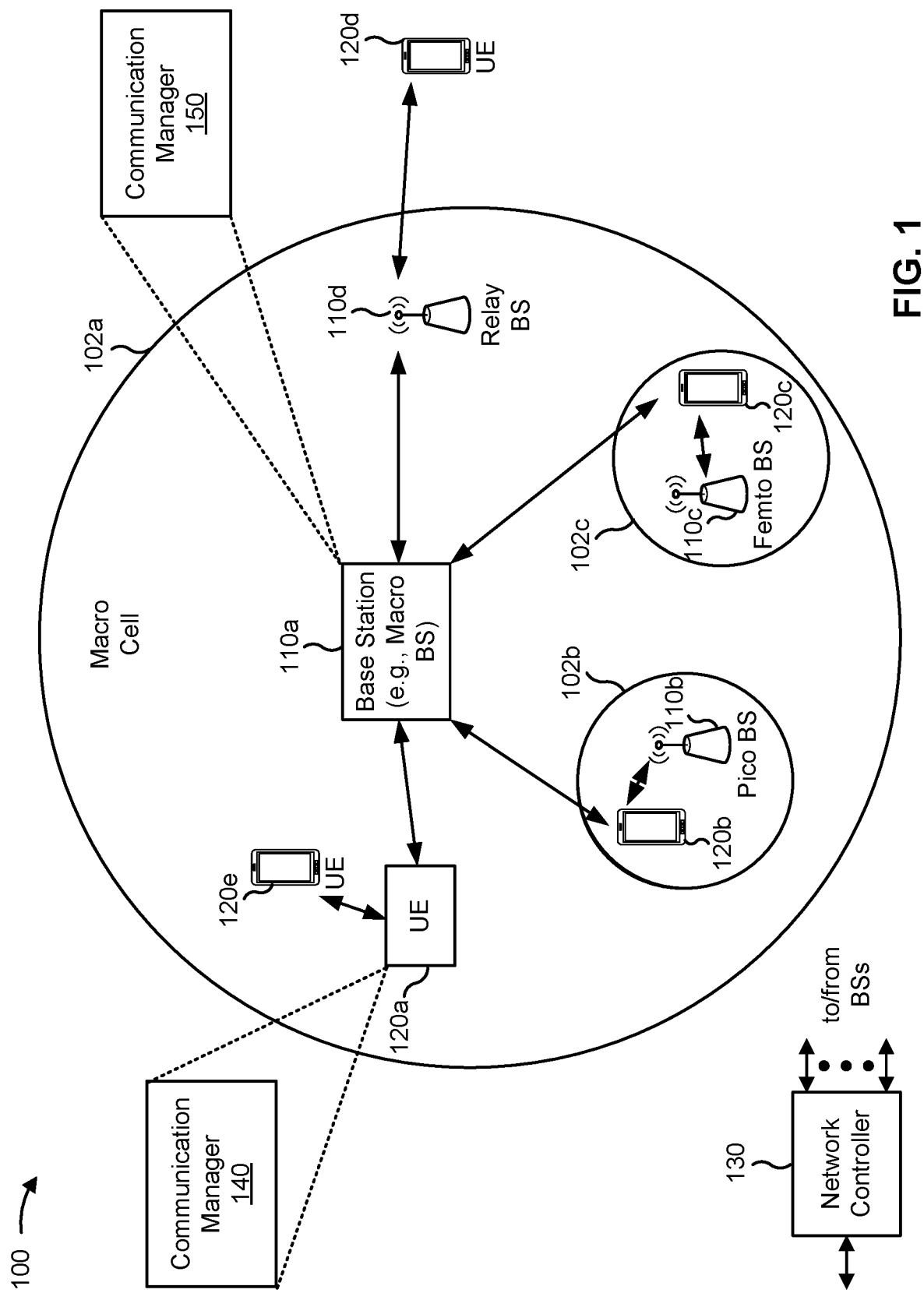
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive (e.g., from the base station 110) a pre-emption indication associated with a scheduled transmission between the base station 110 and the UE 120 and perform energy harvesting, during the scheduled transmission, based at least in part on the pre-emption indication. Additionally, or alternatively, the communication manager 140 may perform one or more other operations described herein.

In some aspects, the base station 110 may include a communication manager 150. As described in more detail elsewhere herein, the communication manager 150 may determine that the UE 120 should perform energy harvesting during a scheduled transmission between the base station 110 and the UE 120 and transmit (e.g., to the UE 120) a pre-emption indication, associated with the scheduled transmission between the base station 110 and the UE 120, to trigger the UE 120 to perform energy harvesting during the scheduled transmission. Additionally, or alternatively, the communication manager 150 may perform one or more other operations described herein.

As indicated above, FIG. 1 is provided as an example. Other examples may differ from what is described with regard to FIG. 1.

Figure 2:
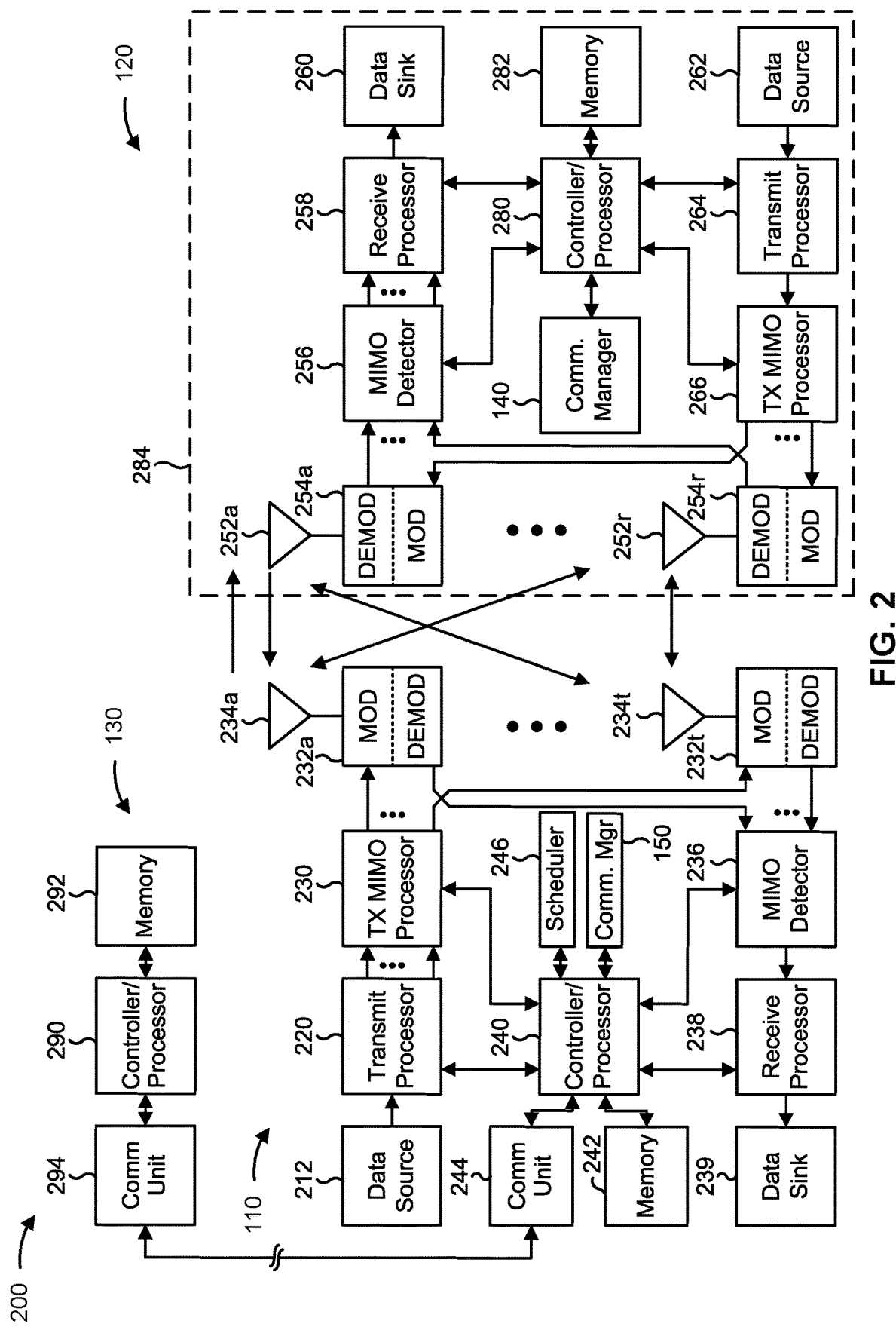
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with energy harvesting based on pre-emption indications, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120 and/or apparatus 1000 of FIG. 10) may include means for receiving, from a base station (e.g., the base station 110 and/or apparatus 1100 of FIG. 11), a pre-emption indication associated with a scheduled transmission between the base station and the UE; and/or means for performing energy harvesting, during the scheduled transmission, based at least in part on the pre-emption indication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the a base station (e.g., the base station 110 and/or apparatus 1100 of FIG. 11) may include means for determining that a UE (e.g., the UE 120 and/or apparatus 1000 of FIG. 10) should perform energy harvesting during a scheduled transmission between the base station and the UE; and/or means for transmitting, to the UE, a pre-emption indication, associated with the scheduled transmission between the base station and the UE, to trigger the UE to perform energy harvesting during the scheduled transmission. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
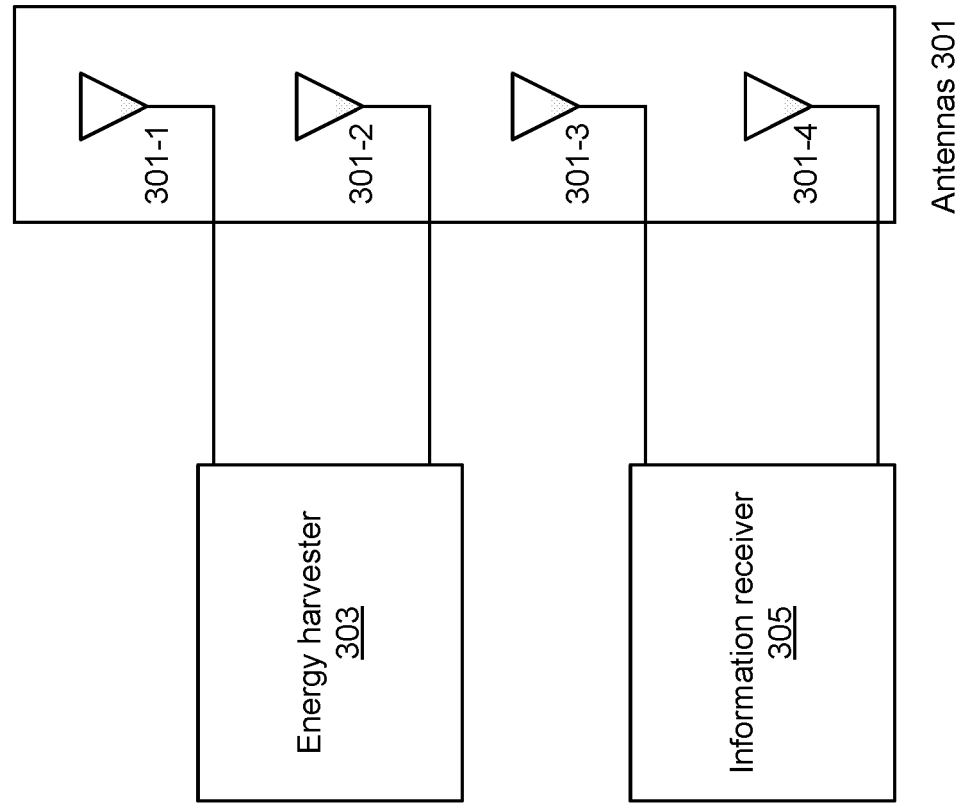
FIGS. 3, 4, and 5 are diagrams illustrating examples of energy harvesting architecture, in accordance with the present disclosure.

FIG. 3 is a diagram illustrating an example 300 of energy harvesting architecture, in accordance with the present disclosure. Energy harvesting helps low- or no-power devices (such as wearable devices like smart watches, IoT devices, or reduced capacity (RedCap) UEs, among other examples) convert energy from received electromagnetic signals into direct current (DC), battery power, or other electrical energy. Accordingly, the electrical energy may be used to perform decoding, signal filtering, encoding, transmitting radio frequency (RF) signals, receiving RF signals, or other tasks. For some devices, such as security tags, energy harvesting may be a sole mechanism for powering the devices. For other devices, such as wearable devices, energy harvesting may be combined with batteries to power the devices.

As shown in FIG. 3, a device may include an array 301 of antennas. In example 300, the device includes four antennas (e.g., antenna 301-1, antenna 301-2, antenna 301-3, and antenna 301-4). Other aspects may include fewer antennas (e.g., three antennas or two antennas) or additional antennas (e.g., five antennas, six antennas, and so on).

In example 300, the array 301 is physically divided between an energy harvester 303 and an information receiver 305. The energy harvester 303 may include a rectenna or another circuit configured to convert RF signals (e.g., received at antenna 301-1 and/or antenna 301-2 in example 300) to DC or another type of electrical energy. The information receiver 305 may include a demodulator, a microprocessor, and/or another circuit configured to output binary data based on RF signals (e.g., received at antenna 301-3 and/or antenna 301-4 in example 300).

Figure 4:
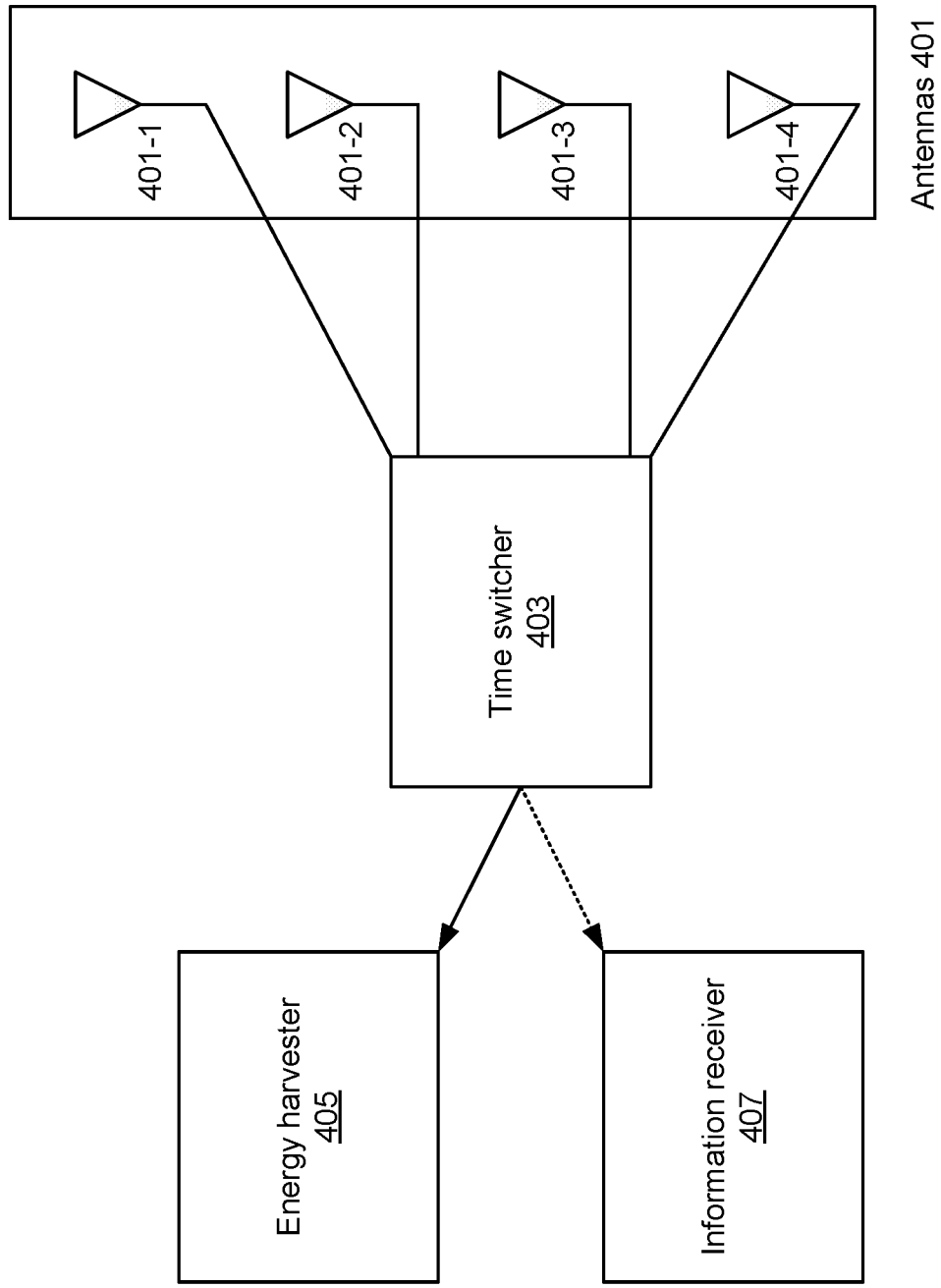

Similar to example 300, example 400 of FIG. 4 includes an array 401 of antennas. In example 400, the device includes four antennas (e.g., antenna 401-1, antenna 401-2, antenna 401-3, and antenna 401-4). Other aspects may include fewer antennas (e.g., three antennas, two antennas, or one antenna) or additional antennas (e.g., five antennas, six antennas, and so on).

In example 400, a time switcher 403 divides incoming analog signals from the array 401 between an energy harvester 405 and an information receiver 407. Accordingly, the device in example 400 harvests energy during some time portions (e.g., during some RF subframes, during some LTE/NR slots, and/or during some OFDM symbols) and decodes information during other time portions.

Figure 5:
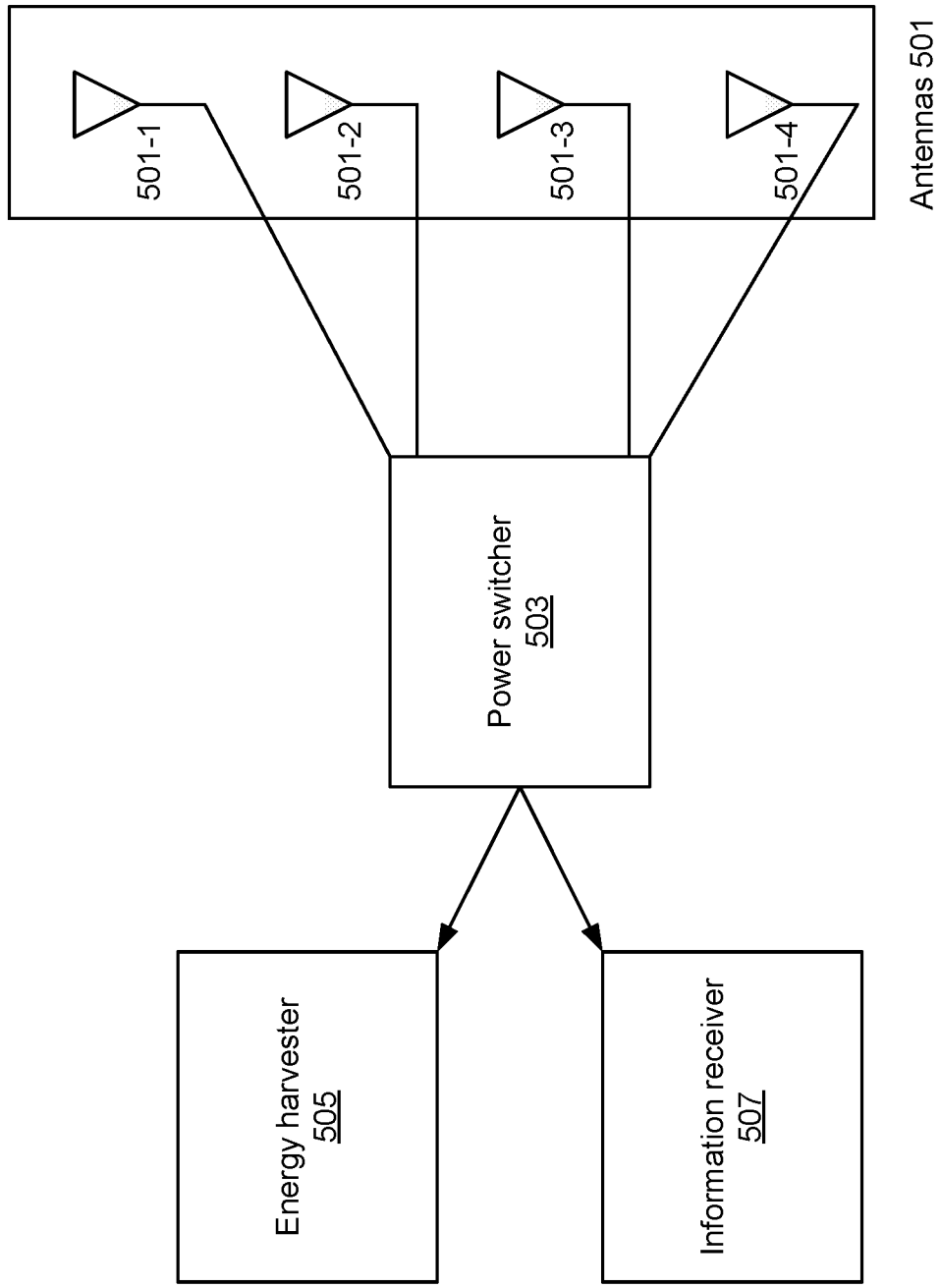

Similar to example 300, example 500 of FIG. 5 includes an array 501 of antennas. In example 500, the device includes four antennas (e.g., antenna 501-1, antenna 501-2, antenna 501-3, and antenna 501-4). Other aspects may include fewer antennas (e.g., three antennas, two antennas, or one antenna) or additional antennas (e.g., five antennas, six antennas, and so on).

In example 500, a power switcher 503 divides incoming analog signals from the array 501 between an energy harvester 505 and an information receiver 507. Accordingly, the device in example 500 may harvest energy and decode information simultaneously as long as the quality of the analog signals are not too low after the power switcher 503 divides the signals. Sometimes, the power switcher 503 may direct more (or all) power toward the energy harvester 505 (e.g., when no information is expected to be received), and other times, the power switcher 503 may direct more (or all) power toward the information receiver 507 (e.g., when information is expected, and the analog signals are not strong enough to be divided).

Sometimes, a network (e.g., via a base station) cancels a scheduled transmission (e.g., from the network to a UE). For example, network resources for the scheduled transmission may be needed for other devices and/or other transmissions. Accordingly, the network may transmit a pre-emption indication associated with the transmission (e.g., format 2_1 downlink control information (DCI) when the transmission is a downlink transmission or format 2_4 DCI when the transmission is an uplink transmission). However, the UE now idles during an amount of time associated with the scheduled transmission.

Some techniques and apparatuses described herein enable a UE (e.g., UE 120) to perform energy harvesting in response to a pre-emption indication from a base station (e.g., the base station 110). As a result, the UE 120 gains power during an amount of time in which the UE 120 would otherwise have been idling. Additionally, in some aspects, the base station 110 may use a pre-emption indication to instruct the UE 120 to perform partial energy harvesting. As a result, the UE 120 gains some power while also decoding information from the base station 110.

As indicated above, FIGS. 3-5 are provided as examples. Other examples may differ from what is described with respect to FIGS. 3-5.

Figure 6:
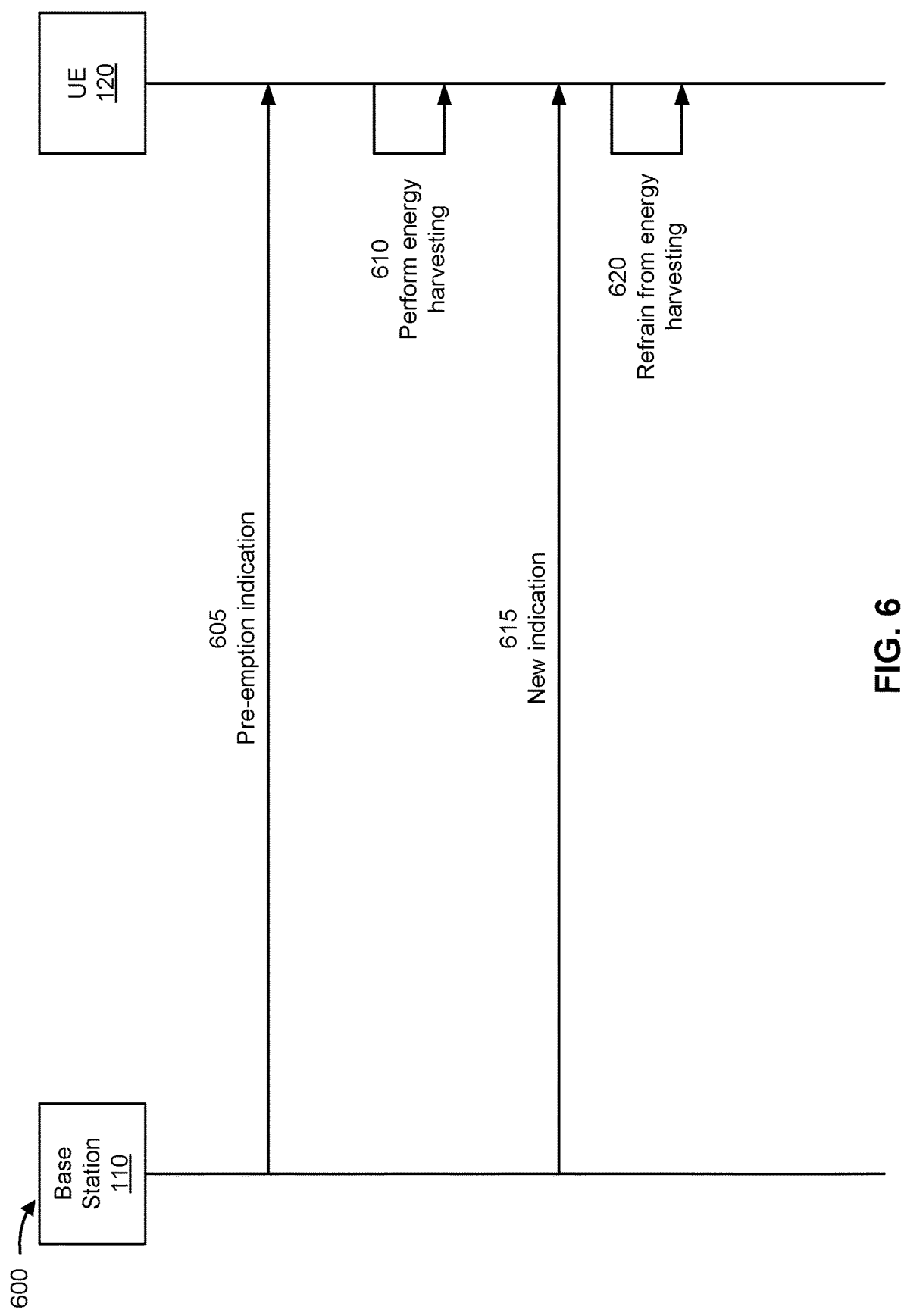
FIGS. 6 and 7 are diagrams illustrating examples associated with energy harvesting based on pre-emption indications, in accordance with the present disclosure.

FIG. 6 is a diagram illustrating an example 600 associated with energy harvesting based on pre-emption indications, in accordance with the present disclosure. As shown in FIG. 6, a base station 110 and a UE 120 may communicate with one another (e.g., on a downlink from the base station 110 to the UE 120 and on an uplink from the UE 120 to the base station 110).

As shown by reference number 605, the base station 110 may transmit, and the UE 120 may receive, a pre-emption indication associated with a scheduled transmission between the base station 110 and the UE 120. For example, the base station 110 may determine that the UE 120 should perform energy harvesting during the scheduled transmission (e.g., by determining that the scheduled transmission is cancelled or by determining that the base station 110 may transmit with higher power during the scheduled transmission to allow for partial energy harvesting).

In some aspects, the pre-emption indication is included in DCI. For example, the DCI may be format 2 DCI, as defined in 3GPP specifications. In some aspects, the pre-emption indication is included in a dedicated DCI message. For example, the DCI may be a new format 2 DCI message associated with downlink transmissions from the base station 110 to the UE 120.

As an alternative, the pre-emption indication is included in an uplink cancellation message. For example, the uplink cancellation message may be included in DCI that is a format 2_4 DCI, as defined in 3GPP specifications. Accordingly, a radio network temporary identifier (RNTI) associated with the uplink cancellation message (e.g., used to scramble DCI including the uplink cancellation message), at least one bit of the uplink cancellation message (e.g., a new field in the DCI including at least one bit), or a combination thereof indicates that the uplink cancellation message is associated with energy harvesting. As a result, the UE 120 is able to identify that the uplink cancellation message is also associated with energy harvesting during an upcoming downlink transmission.

As shown by reference number 610, the UE 120 may perform energy harvesting, during the scheduled transmission, based at least in part on the pre-emption indication. For example, the UE 120 may use architecture as described in connection with FIGS. 3, 4, and/or 5 to perform energy harvesting during the scheduled transmission.

In some aspects, the pre-emption indication may be associated with partial energy harvesting (e.g., as described in connection with reference numbers 715 and 720 of FIG. 7). For example, the UE 120 may use power division (e.g., as described in connection with FIG. 5) and/or time division (e.g., as described in connection with FIG. 4) to perform partial energy harvesting during the scheduled transmission. Accordingly, the pre-emption indication may include a charging rate associated with the partial energy harvesting. For example, the pre-emption indication may indicate a fraction of time associated with the partial energy harvesting (e.g., represented by $\alpha$) or a fraction of time associated with data reception (e.g., represented by $(1-\alpha)$). In another example, the pre-emption indication may indicate a fraction of power associated with the partial energy harvesting (e.g., represented by $\rho$) or a fraction of power associated with data reception (e.g., represented by $(1-\rho)$).

Additionally, the pre-emption indication may further include an MCS associated with the partial energy harvesting. For example, the base station 110 may indicate a lower MCS than originally indicated for the scheduled transmission in order to increase reliability of signals that are divided between energy harvesting and decoding. The pre-emption indication may include the new, lower MCS or may include a differential between the original MCS and the new, lower MCS.

In some aspects, the pre-emption indication is associated with all upcoming transmissions to the UE 120. Accordingly, the UE 120 may perform energy harvesting during all upcoming transmissions from the base station 110. For example, the UE 120 may perform energy harvesting for any transmissions scheduled when the pre-emption indication was received (e.g., by DCI received before the pre-emption indication) as well as any transmissions scheduled after the pre-emption indication was received (e.g., by DCI received after the pre-emption indication). Therefore, as shown by reference number 615, the base station 110 may transmit, and the UE 120 may receive, a new indication to stop energy harvesting. The new indication may be included in DCI. For example, the DCI may be format 2 DCI, as defined in 3GPP specifications. As described above, the new indication may be included in a dedicated DCI message or in an uplink cancellation message.

As shown by reference number 620, the UE 120 may refrain from performing energy harvesting based at least in part on the new indication. For example, the UE 120 may refrain from performing energy harvesting for any transmissions scheduled when the new indication was received (e.g., by DCI received before the new indication) and/or during any transmissions scheduled after the new indication was received (e.g., by DCI received after the new indication).

By using techniques as described in connection with FIG. 6, the UE 120 performs energy harvesting in response to a pre-emption indication from a base station. As a result, the UE 120 gains power during an amount of time in which the UE 120 would otherwise have been idling.

As indicated above, FIG. 6 is provided as an example. Other examples may differ from what is described with respect to FIG. 6.

Figure 7:
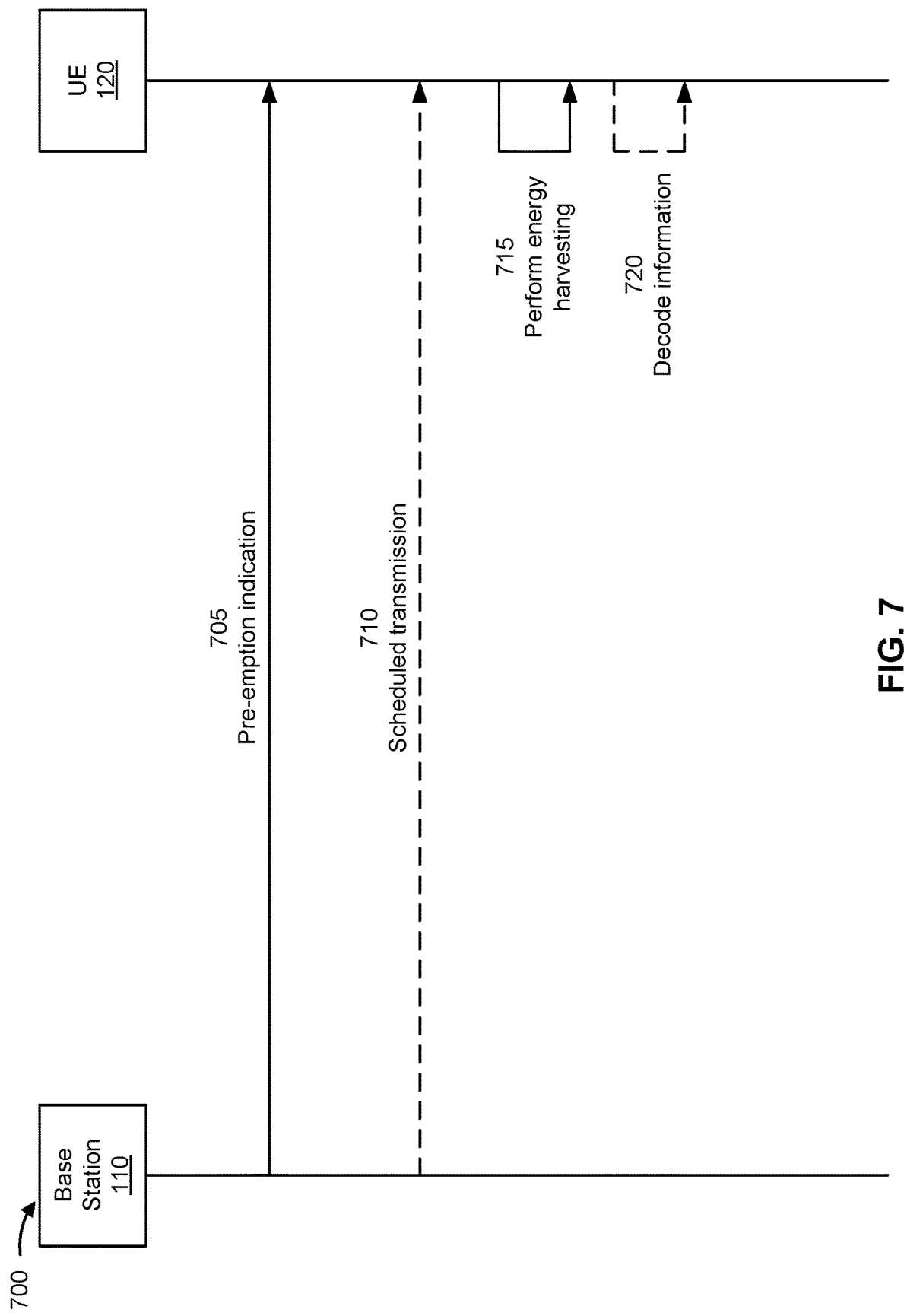

FIG. 7 is a diagram illustrating an example 700 associated with energy harvesting based on pre-emption indications, in accordance with the present disclosure. As shown in FIG. 7, a base station 110 and a UE 120 may communicate with one another (e.g., on a downlink from the base station 110 to the UE 120 and on an uplink from the UE 120 to the base station 110).

As shown by reference number 705, the base station 110 may transmit, and the UE 120 may receive, a pre-emption indication associated with a scheduled transmission between the base station 110 and the UE 120. For example, the base station 110 may transmit the pre-emption indication as described in connection with reference number 605 of FIG. 6.

As shown by reference number 710, the base station 110 may transmit, and the UE 120 may receive, downlink signals during the scheduled transmission. For example, the pre-emption indication may be associated with partial energy harvesting (e.g., as described in connection with reference numbers 715 and 720). Accordingly, the UE 120 may use power division (e.g., as described in connection with FIG. 5) and/or time division (e.g., as described in connection with FIG. 4) to perform partial energy harvesting during the scheduled transmission. Accordingly, the pre-emption indication may include a charging rate associated with the partial energy harvesting. For example, the pre-emption indication may indicate a fraction of time associated with the partial energy harvesting (e.g., represented by $\alpha$) or a fraction of time associated with data reception (e.g., represented by $(1-\alpha)$). In another example, the pre-emption indication may indicate a fraction of power associated with the partial energy harvesting (e.g., represented by $\rho$) or a fraction of power associated with data reception (e.g., represented by $(1-\rho)$).

Additionally, the pre-emption indication may further include an MCS associated with the partial energy harvesting. For example, the base station 110 may indicate a lower MCS than originally indicated for the scheduled transmission in order to increase reliability of signals that are divided between energy harvesting and decoding. The pre-emption indication may include the new, lower MCS or may include a differential between the original MCS and the new, lower MCS.

Accordingly, to enable partial energy harvesting, the base station 110 may transmit signals to the UE 120 (e.g., that encode control information, data, and/or other information) with a lower MCS in order to improve reliability of the signals that the UE 120 splits using power division (e.g., as described in connection with FIG. 5) and/or time division (e.g., as described in connection with FIG. 4).

Alternatively, to enable full energy harvesting, the base station 110 cancels transmission to the UE 120 such that the UE 120 uses whatever signals are transmitted by the base station 110 (e.g., to another UE and/or broadcast signals, such as system information, reference signals, and so on) and/or by nearby base stations to perform energy harvesting. Accordingly, the base station 110 may schedule transmissions to other UEs, reference signal transmissions, broadcast transmissions, and/or other transmissions in lieu of the scheduled transmission to the UE 120.

As shown by reference number 715, the UE 120 may perform energy harvesting, during the scheduled transmission, based at least in part on the pre-emption indication. In some aspects, and as described in connection with reference number 610 of FIG. 6, the UE 120 may perform energy harvesting during all upcoming transmissions from the base station 110.

As an alternative, the pre-emption indication may be associated with one or more time resources and one or more frequency resources. For example, the pre-emption indication may indicate one or more resource blocks (RBs) and/or other portions of a frequency spectrum to use for energy harvesting. Similarly, the pre-emption indication may indicate one or more slots or symbols and/or other portions of a time spectrum to use for energy harvesting. Accordingly, the UE 120 may perform energy harvesting using the indicated resource(s).

In some aspects, the scheduled transmission overlaps, at least in part, with the resource(s) associated with the pre-emption indication. Accordingly, the UE 120 may perform energy harvesting during an entirety of the scheduled transmission. For example, if a physical downlink shared channel (PDSCH) and/or other downlink transmission stretches before or after the time resource(s) associated with the pre-emption indication, the UE 120 may perform energy harvesting during an entire time period scheduled for the PDSCH transmission. Similar, if a PDSCH and/or other downlink transmission includes RBs higher or lower in frequency than the frequency resource(s) associated with the pre-emption indication, the UE 120 may perform energy harvesting across an entire portion of the frequency spectrum scheduled for the PDSCH transmission.

As an alternative, the UE 120 may perform energy harvesting during a portion of the scheduled transmission that overlaps with the resource(s) associated with the pre-emption indication. Accordingly, the UE 120 performs energy harvesting using the indicated resource(s) regardless of overlap between the scheduled transmission and the indicated resource(s).

In some aspects, when the scheduled transmission has a partial overlap with the resource(s) associated with the pre-emption indication, the UE 120 may determine whether to perform energy harvesting based at least in part on the partial overlap. For example, the UE 120 may apply an overlap threshold such that the UE 120 performs energy harvesting when the partial overlap satisfies the threshold. The overlap threshold may be programmed (and/or otherwise preconfigured) into the UE 120 (e.g., according to 3GPP specifications and/or another standard). Additionally, or alternatively, the base station 110 may indicate, to the UE 120, the overlap threshold to use. In a combinatory example, the base station may indicate the overlap threshold to use from a plurality of possible thresholds that are programmed (and/or otherwise preconfigured) into the UE 120 (e.g., according to 3GPP specifications and/or another standard). When the UE 120 determines to perform energy harvesting, the UE 120 may perform energy harvesting using the indicated resource(s) or may perform energy harvesting during an entirety of the scheduled transmission.

In some aspects, as described above, the UE 120 may perform partial energy harvesting. Accordingly, as shown by reference number 720, the UE 120 may decode information during the scheduled transmission, based at least in part on the pre-emption indication. For example, the UE 120 may demodulate received signals (e.g., divided according to a charging rate included in the pre-emption indication, as described above) and decode the demodulated signals into binary information.

By using techniques as described in connection with FIG. 7, the base station 110 uses a pre-emption indication to instruct the UE 120 to perform partial energy harvesting. As a result, the UE 120 gains some power while also decoding information from the base station 110.

As indicated above, FIG. 7 is provided as an example. Other examples may differ from what is described with respect to FIG. 7.

Figure 8:
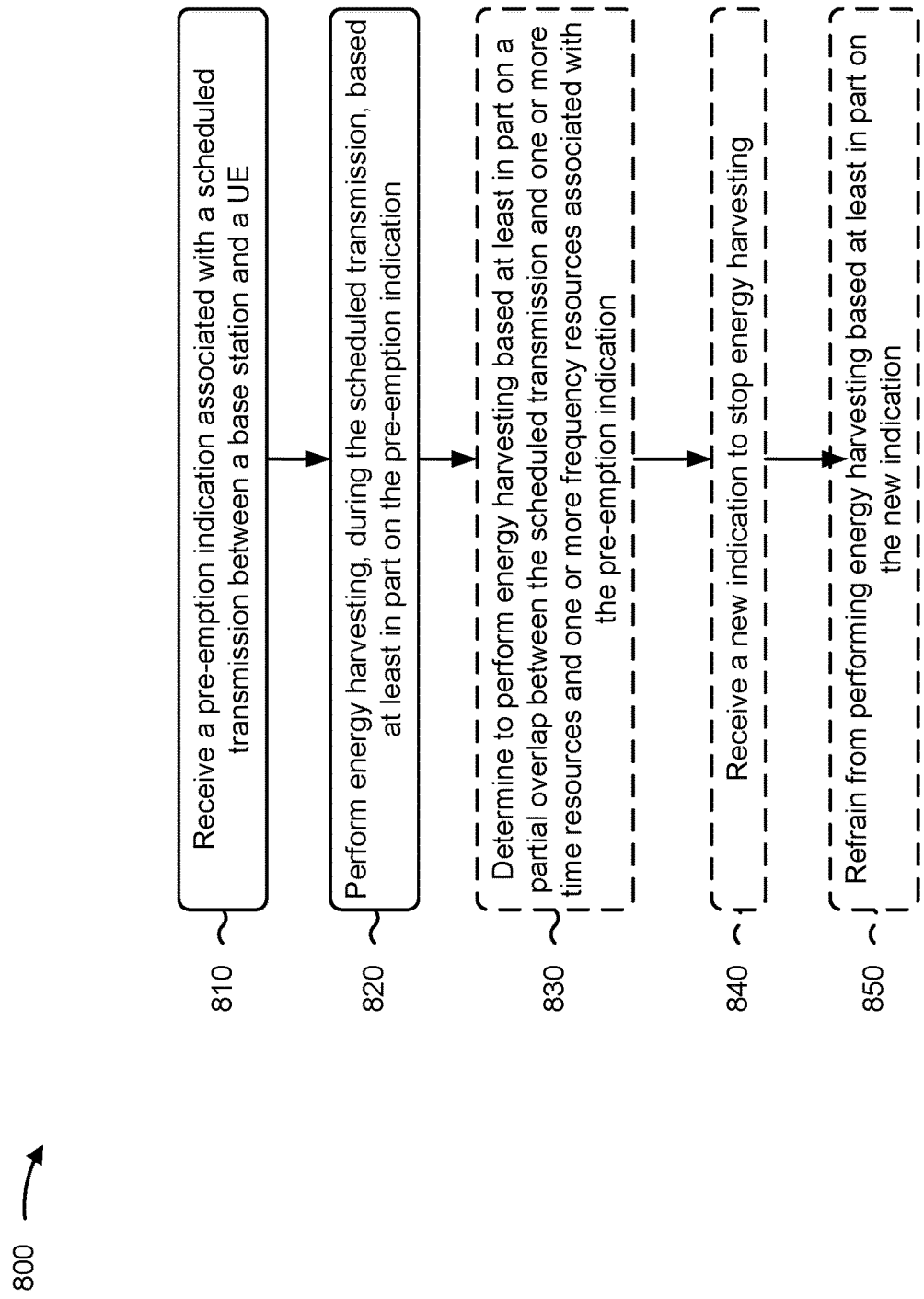
FIGS. 8 and 9 are diagrams illustrating example processes associated with energy harvesting based on pre-emption indications, in accordance with the present disclosure.

FIG. 8 is a diagram illustrating an example process 800 performed, for example, by a UE, in accordance with the present disclosure. Example process 800 is an example where the UE (e.g., UE 120 and/or apparatus 1000 of FIG. 10) performs operations associated with energy harvesting based on pre-emption indications.

As shown in FIG. 8, in some aspects, process 800 may include receiving, from a base station (e.g., base station 110 and/or apparatus 1100 of FIG. 11), a pre-emption indication associated with a scheduled transmission between the base station and the UE (block 810). For example, the UE (e.g., using communication manager 140 and/or reception component 1002, depicted in FIG. 10) may receive, from a base station, a pre-emption indication associated with a scheduled transmission between the base station and the UE, as described herein.

As further shown in FIG. 8, in some aspects, process 800 may include performing energy harvesting, during the scheduled transmission, based at least in part on the pre-emption indication (block 820). For example, the UE (e.g., using communication manager 140 and/or energy harvesting component 1008, depicted in FIG. 10) may perform energy harvesting, during the scheduled transmission, based at least in part on the pre-emption indication, as described herein.

In some aspects, as further shown in FIG. 8, process 800 may include determining to perform energy harvesting based at least in part on a partial overlap between the scheduled transmission and one or more time resources and one or more frequency resources associated with the pre-emption indication (block 830). For example, the UE (e.g., using communication manager 140 and/or determination component 1010, depicted in FIG. 10) may determine to perform energy harvesting based at least in part on a partial overlap between the scheduled transmission and one or more time resources and one or more frequency resources associated with the pre-emption indication, as described herein.

In some aspects, as further shown in FIG. 8, process 800 may include receiving, from the base station, a new indication to stop energy harvesting (block 840). For example, the UE (e.g., using communication manager 140 and/or reception component 1002) may receive, from the base station, a new indication to stop energy harvesting, as described herein.

In some aspects, as further shown in FIG. 8, process 800 may include refraining from performing energy harvesting based at least in part on the new indication (block 850). For example, the UE (e.g., using communication manager 140 and/or energy harvesting component 1008) may refrain from performing energy harvesting based at least in part on the new indication, as described herein.

Process 800 may include additional aspects, such as any single aspect or any combination of aspects described below and/or in connection with one or more other processes described elsewhere herein.

In a first aspect, the pre-emption indication is included in DCI.

In a second aspect, alone or in combination with the first aspect, the pre-emption indication is included in format 2 DCI.

In a third aspect, alone or in combination with one or more of the first and second aspects, the energy harvesting is performed during all transmissions from the base station that were scheduled when the pre-emption indication was received.

In a fourth aspect, alone or in combination with one or more of the first through third aspects, the energy harvesting is performed during all upcoming transmissions from the base station.

In a fifth aspect, alone or in combination with one or more of the first through fourth aspects, the pre-emption indication is associated with one or more time resources and one or more frequency resources.

In a sixth aspect, alone or in combination with one or more of the first through fifth aspects, the scheduled transmission overlaps, at least in part, with the one or more time resources and the one or more frequency resources, and energy harvesting is performed during an entirety of the scheduled transmission.

In a seventh aspect, alone or in combination with one or more of the first through sixth aspects, the scheduled transmission partially overlaps with the one or more time resources and the one or more frequency resources, and energy harvesting is performed during a portion of the scheduled transmission that overlaps with the one or more time resources and the one or more frequency resources.

In an eighth aspect, alone or in combination with one or more of the first through seventh aspects, the pre-emption indication is included in an uplink cancellation message.

In a ninth aspect, alone or in combination with one or more of the first through eighth aspects, an RNTI associated with the uplink cancellation message, at least one bit of the uplink cancellation message, or a combination thereof indicates that the uplink cancellation message is associated with energy harvesting.

In a tenth aspect, alone or in combination with one or more of the first through ninth aspects, the pre-emption indication is included in a dedicated DCI message.

In an eleventh aspect, alone or in combination with one or more of the first through tenth aspects, the pre-emption indication is associated with partial energy harvesting, and the pre-emption indication includes a charging rate associated with the partial energy harvesting.

In a twelfth aspect, alone or in combination with one or more of the first through eleventh aspects, the pre-emption indication further includes an MCS associated with the partial energy harvesting.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
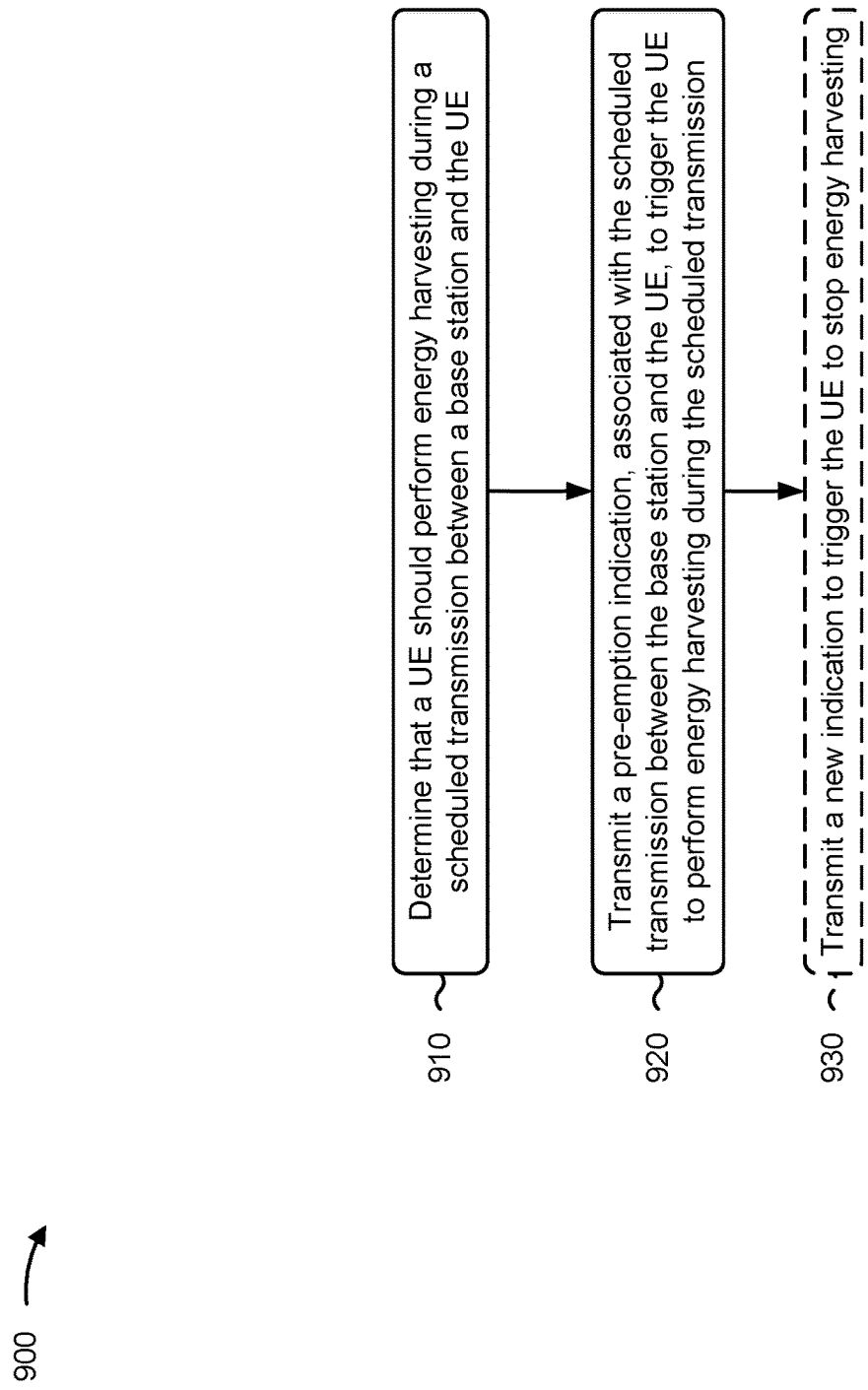

FIG. 9 is a diagram illustrating an example process 900 performed, for example, by a base station, in accordance with the present disclosure. Example process 900 is an example where the base station (e.g., base station 110 and/or apparatus 1100 of FIG. 11) performs operations associated with energy harvesting based on pre-emption indications.

As shown in FIG. 9, in some aspects, process 900 may include determining that a UE (e.g., UE 120 and/or apparatus 1000 of FIG. 10) should perform energy harvesting during a scheduled transmission between the base station and the UE (block 910). For example, the base station (e.g., using communication manager 150 and/or determination component 1108, depicted in FIG. 11) may determine that a UE should perform energy harvesting during a scheduled transmission between the base station and the UE, as described herein.

As further shown in FIG. 9, in some aspects, process 900 may include transmitting, to the UE, a pre-emption indication, associated with the scheduled transmission between the base station and the UE, to trigger the UE to perform energy harvesting during the scheduled transmission (block 920). For example, the base station (e.g., using communication manager 150 and/or transmission component 1104, depicted in FIG. 11) may transmit, to the UE, a pre-emption indication, associated with the scheduled transmission between the base station and the UE, to trigger the UE to perform energy harvesting during the scheduled transmission, as described herein.

In some aspects, as further shown in FIG. 9, process 900 may include transmitting, to the UE, a new indication to trigger the UE to stop energy harvesting (block 930). For example, the base station (e.g., using communication manager 150 and/or transmission component 1104) may transmit, to the UE, a new indication to trigger the UE to stop energy harvesting, as described herein.

Process 900 may include additional aspects, such as any single aspect or any combination of aspects described below and/or in connection with one or more other processes described elsewhere herein.

In a first aspect, the pre-emption indication is included in DCI.

In a second aspect, alone or in combination with the first aspect, the pre-emption indication is included in format 2 DCI.

In a third aspect, alone or in combination with one or more of the first and second aspects, the pre-emption indication is associated with all transmissions to the UE that were scheduled when the pre-emption indication was received.

In a fourth aspect, alone or in combination with one or more of the first through third aspects, the pre-emption indication is associated with all upcoming transmissions to the UE.

In a fifth aspect, alone or in combination with one or more of the first through fourth aspects, the pre-emption indication is associated with one or more time resources and one or more frequency resources.

In a sixth aspect, alone or in combination with one or more of the first through fifth aspects, the scheduled transmission overlaps, at least in part, with the one or more time resources and the one or more frequency resources, and the pre-emption indication is associated with energy harvesting during an entirety of the scheduled transmission.

In a seventh aspect, alone or in combination with one or more of the first through sixth aspects, the scheduled transmission partially overlaps with the one or more time resources and the one or more frequency resources, and the pre-emption indication is associated with energy harvesting during a portion of the scheduled transmission that overlaps with the one or more time resources and the one or more frequency resources.

In an eighth aspect, alone or in combination with one or more of the first through seventh aspects, the scheduled transmission has a partial overlap with the one or more time resources and the one or more frequency resources, and the pre-emption indication is associated with energy harvesting based at least in part on the partial overlap.

In a ninth aspect, alone or in combination with one or more of the first through eighth aspects, the pre-emption indication is included in an uplink cancellation message.

In a tenth aspect, alone or in combination with one or more of the first through ninth aspects, an RNTI associated with the uplink cancellation message, at least one bit of the uplink cancellation message, or a combination thereof indicates that the uplink cancellation message is associated with energy harvesting.

In an eleventh aspect, alone or in combination with one or more of the first through eleventh aspects, the pre-emption indication is included in a dedicated DCI message.

In a twelfth aspect, alone or in combination with one or more of the first through eleventh aspects, the pre-emption indication is associated with partial energy harvesting, and the pre-emption indication includes a charging rate associated with the partial energy harvesting.

In a thirteenth aspect, alone or in combination with one or more of the first through twelfth aspects, the pre-emption indication further includes an MCS associated with the partial energy harvesting.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
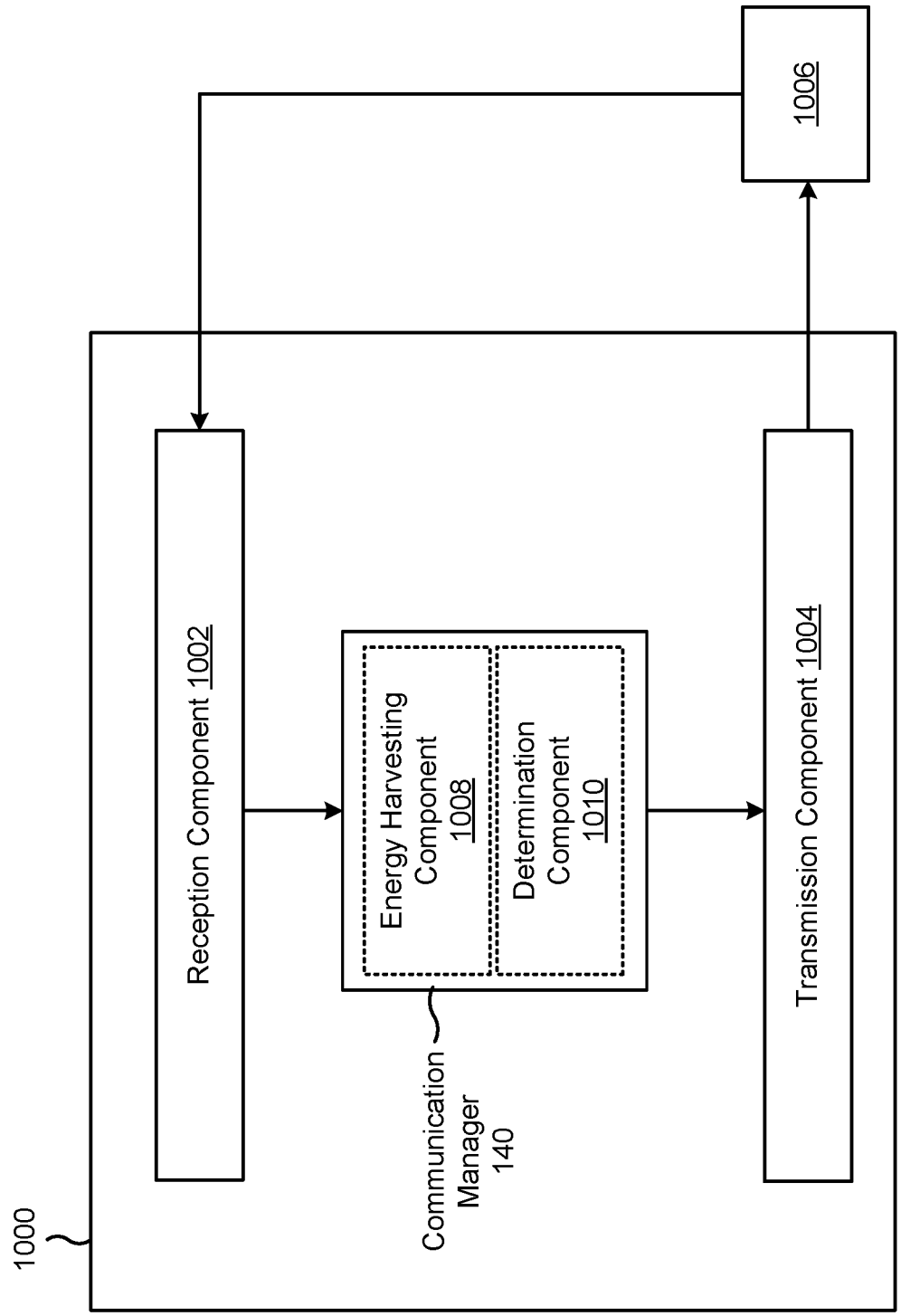
FIGS. 10 and 11 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an energy harvesting component 1008 and/or a determination component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

In some aspects, the reception component 1002 may receive (e.g., from the apparatus 1006, such as a base station) a pre-emption indication associated with a scheduled transmission between the apparatus 1006 and the apparatus 1000. Accordingly, the energy harvesting component 1008 may perform energy harvesting, during the scheduled transmission, based at least in part on the reception component 1002 receiving the pre-emption indication. The energy harvesting component 1008 may include one or more antennas, a modem, a demodulator, or a combination thereof, of the UE described in connection with FIG. 2 and/or circuitry as described in connection with FIGS. 3, 4, and/or 5.

In some aspects, the determination component 1010 may determine to perform energy harvesting based at least in part on a partial overlap between the scheduled transmission and one or more time resources and one or more frequency resources associated with the pre-emption indication. The determination component 1010 may include a MIMO detector, a receive processor, a transmit MIMO processor, a transmit processor, a controller/processor, a memory, or a combination thereof, of the UE described in connection with FIG. 2. Accordingly, the energy harvesting component 1008 may perform energy harvesting based at least in part on output from the determination component 1010.

In some aspects, the reception component 1002 may receive (e.g., from the apparatus 1006) a new indication to stop energy harvesting. Accordingly, the energy harvesting component 1008 may refrain from performing energy harvesting based at least in part on the reception component 1002 receiving the new indication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
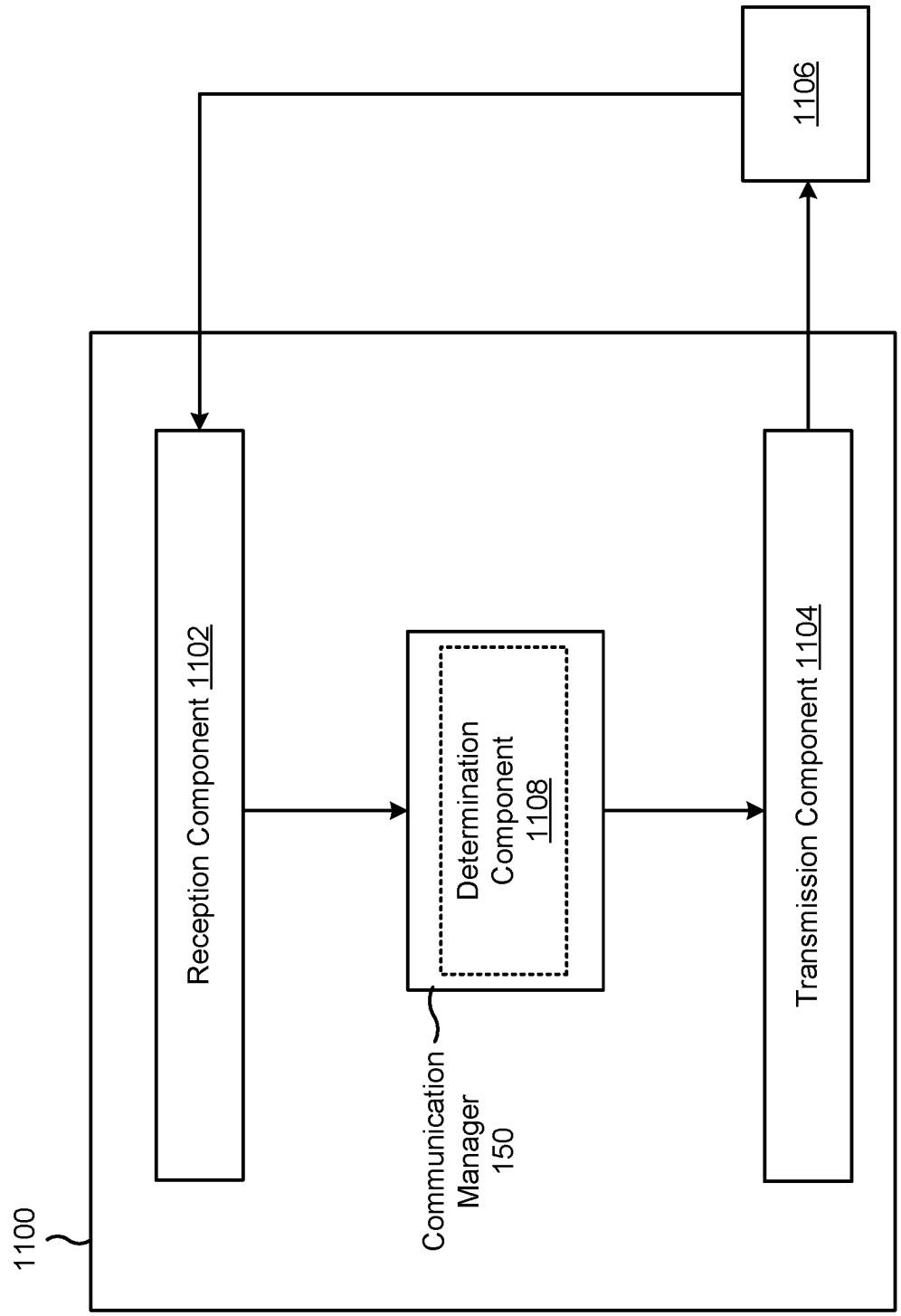

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

In some aspects, the determination component 1108 may determine that the apparatus 1106 (such as a UE) should perform energy harvesting during a scheduled transmission between the apparatus 1100 and the apparatus 1106. The determination component 1108 may include a MIMO detector, a receive processor, a transmit MIMO processor, a transmit processor, a controller/processor, a memory, or a combination thereof, of the base station described in connection with FIG. 2. Accordingly, the transmission component 1104 may transmit (e.g., to the apparatus 1106) a pre-emption indication, associated with the scheduled transmission between the apparatus 1100 and the apparatus 1106, to trigger the apparatus 1106 to perform energy harvesting during the scheduled transmission. In some aspects, the transmission component 1104 may further transmit (e.g., to the apparatus 1106) a new indication to trigger the apparatus 1106 to stop energy harvesting.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a base station, a pre-emption indication associated with a scheduled transmission between the base station and the UE; and performing energy harvesting, during the scheduled transmission, based at least in part on the pre-emption indication.

Aspect 2: The method of Aspect 1, wherein the pre-emption indication is included in downlink control information (DCI).

Aspect 3: The method of Aspect 2, wherein the DCI is format 2 DCI.

Aspect 4: The method of any of Aspects 1 through 3, wherein the energy harvesting is performed during all transmissions from the base station that were scheduled when the pre-emption indication was received.

Aspect 5: The method of any of Aspects 1 through 3, wherein the energy harvesting is performed during all upcoming transmissions from the base station.

Aspect 6: The method of Aspect 5, further comprising: receiving, from the base station, a new indication to stop energy harvesting; and refraining from performing energy harvesting based at least in part on the new indication.

Aspect 7: The method of any of Aspects 1 through 3, wherein the pre-emption indication is associated with one or more time resources and one or more frequency resources.

Aspect 8: The method of Aspect 7, wherein the scheduled transmission overlaps, at least in part, with the one or more time resources and the one or more frequency resources, and energy harvesting is performed during an entirety of the scheduled transmission.

Aspect 9: The method of Aspect 7, wherein the scheduled transmission partially overlaps with the one or more time resources and the one or more frequency resources, and energy harvesting is performed during a portion of the scheduled transmission that overlaps with the one or more time resources and the one or more frequency resources.

Aspect 10: The method of Aspect 7, wherein the scheduled transmission has a partial overlap with the one or more time resources and the one or more frequency resources, and the method further comprises: determining to perform energy harvesting based at least in part on the partial overlap.

Aspect 11: The method of any of Aspects 1 through 10, wherein the pre-emption indication is included in an uplink cancellation message.

Aspect 12: The method of Aspect 11, wherein a radio network temporary identifier (RNTI) associated with the uplink cancellation message, at least one bit of the uplink cancellation message, or a combination thereof indicates that the uplink cancellation message is associated with energy harvesting.

Aspect 13: The method of any of Aspects 1 through 10, wherein the pre-emption indication is included in a dedicated downlink control information (DCI) message.

Aspect 14: The method of any of Aspects 1 through 13, wherein the pre-emption indication is associated with partial energy harvesting, and the pre-emption indication includes a charging rate associated with the partial energy harvesting.

Aspect 15: The method of Aspect 14, wherein the pre-emption indication further includes a modulation and coding scheme (MCS) associated with the partial energy harvesting.

Aspect 16: A method of wireless communication performed by a base station, comprising: determining that a user equipment (UE) should perform energy harvesting during a scheduled transmission between the base station and the UE; and transmitting, to the UE, a pre-emption indication, associated with the scheduled transmission between the base station and the UE, to trigger the UE to perform energy harvesting during the scheduled transmission.

Aspect 17: The method of Aspect 16, wherein the pre-emption indication is included in downlink control information (DCI).

Aspect 18: The method of Aspect 17, wherein the DCI is format 2 DCI.

Aspect 19: The method of any of Aspects 16 through 18, wherein the pre-emption indication is associated with all transmissions to the UE that were scheduled when the pre-emption indication was received.

Aspect 20: The method of any of Aspects 16 through 18, wherein the pre-emption indication is associated with all upcoming transmissions to the UE.

Aspect 21: The method of Aspect 20, further comprising: transmitting, to the UE, a new indication to trigger the UE to stop energy harvesting.

Aspect 22: The method of any of Aspects 16 through 18, wherein the pre-emption indication is associated with one or more time resources and one or more frequency resources.

Aspect 23: The method of Aspect 22, wherein the scheduled transmission overlaps, at least in part, with the one or more time resources and the one or more frequency resources, and the pre-emption indication is associated with energy harvesting during an entirety of the scheduled transmission.

Aspect 24: The method of Aspect 22, wherein the scheduled transmission partially overlaps with the one or more time resources and the one or more frequency resources, and the pre-emption indication is associated with energy harvesting during a portion of the scheduled transmission that overlaps with the one or more time resources and the one or more frequency resources.

Aspect 25: The method of Aspect 22, wherein the scheduled transmission has a partial overlap with the one or more time resources and the one or more frequency resources, and the pre-emption indication is associated with energy harvesting based at least in part on the partial overlap.

Aspect 26: The method of any of Aspects 16 through 25, wherein the pre-emption indication is included in an uplink cancellation message.

Aspect 27: The method of Aspect 26, wherein a radio network temporary identifier (RNTI) associated with the uplink cancellation message, at least one bit of the uplink cancellation message, or a combination thereof indicates that the uplink cancellation message is associated with energy harvesting.

Aspect 28: The method of any of Aspects 16 through 25, wherein the pre-emption indication is included in a dedicated downlink control information (DCI) message.

Aspect 29: The method of any of Aspects 16 through 28, wherein the pre-emption indication is associated with partial energy harvesting, and the pre-emption indication includes a charging rate associated with the partial energy harvesting.

Aspect 30: The method of Aspect 29, wherein the pre-emption indication further includes a modulation and coding scheme (MCS) associated with the partial energy harvesting.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a base station, a pre-emption indication associated with a scheduled transmission between the base station and the UE; and
perform energy harvesting, during the scheduled transmission, based at least in part on the pre-emption indication.

2. The apparatus of claim 1, wherein the pre-emption indication is included in downlink control information (DCI).

3. The apparatus of claim 2, wherein the DCI is format 2 DCI.

4. The apparatus of claim 1, wherein the energy harvesting is performed during all transmissions from the base station that were scheduled when the pre-emption indication was received.

5. The apparatus of claim 1, wherein the energy harvesting is performed during all upcoming transmissions from the base station.

6. The apparatus of claim 5, wherein the one or more processors are further configured to:
receive, from the base station, a new indication to stop energy harvesting; and
refrain from performing energy harvesting based at least in part on the new indication.

7. The apparatus of claim 1, wherein the pre-emption indication is associated with one or more time resources and one or more frequency resources.

8. The apparatus of claim 7, wherein the scheduled transmission overlaps, at least in part, with the one or more time resources and the one or more frequency resources, and energy harvesting is performed during an entirety of the scheduled transmission.

9. The apparatus of claim 7, wherein the scheduled transmission partially overlaps with the one or more time resources and the one or more frequency resources, and energy harvesting is performed during a portion of the scheduled transmission that overlaps with the one or more time resources and the one or more frequency resources.

10. The apparatus of claim 7, wherein the scheduled transmission has a partial overlap with the one or more time resources and the one or more frequency resources, and the one or more processors are further configured to:
determine to perform energy harvesting based at least in part on the partial overlap.

11. The apparatus of claim 1, wherein the pre-emption indication is included in an uplink cancellation message.

12. The apparatus of claim 11, wherein a radio network temporary identifier (RNTI) associated with the uplink cancellation message, at least one bit of the uplink cancellation message, or a combination thereof indicates that the uplink cancellation message is associated with energy harvesting.

13. The apparatus of claim 1, wherein the pre-emption indication is included in a dedicated downlink control information (DCI) message.

14. The apparatus of claim 1, wherein the pre-emption indication is associated with partial energy harvesting, and the pre-emption indication includes a charging rate associated with the partial energy harvesting.

15. The apparatus of claim 14, wherein the pre-emption indication further includes a modulation and coding scheme (MCS) associated with the partial energy harvesting.

16. An apparatus for wireless communication at a base station, comprising:
a memory; and
one or more processors, coupled to the memory, configured to:
determine that a user equipment (UE) should perform energy harvesting during a scheduled transmission between the base station and the UE; and
transmit, to the UE, a pre-emption indication, associated with the scheduled transmission between the base station and the UE, to trigger the UE to perform energy harvesting during the scheduled transmission.

17. The apparatus of claim 16, wherein the pre-emption indication is associated with all transmissions to the UE that were scheduled when the pre-emption indication was received.

18. The apparatus of claim 16, wherein the pre-emption indication is associated with all upcoming transmissions to the UE.

19. The apparatus of claim 18, wherein the one or more processors are further configured to:
transmit, to the UE, a new indication to trigger the UE to stop energy harvesting.

20. The apparatus of claim 16, wherein the pre-emption indication is associated with one or more time resources and one or more frequency resources.

21. The apparatus of claim 20, wherein the scheduled transmission overlaps, at least in part, with the one or more time resources and the one or more frequency resources, and the pre-emption indication is associated with energy harvesting during an entirety of the scheduled transmission.

22. The apparatus of claim 20, wherein the scheduled transmission partially overlaps with the one or more time resources and the one or more frequency resources, and the pre-emption indication is associated with energy harvesting during a portion of the scheduled transmission that overlaps with the one or more time resources and the one or more frequency resources.

23. The apparatus of claim 20, wherein the scheduled transmission has a partial overlap with the one or more time resources and the one or more frequency resources, and the pre-emption indication is associated with energy harvesting based at least in part on the partial overlap.

24. The apparatus of claim 16, wherein the pre-emption indication is included in an uplink cancellation message.

25. The apparatus of claim 24, wherein a radio network temporary identifier (RNTI) associated with the uplink cancellation message, at least one bit of the uplink cancellation message, or a combination thereof indicates that the uplink cancellation message is associated with energy harvesting.

26. The apparatus of claim 16, wherein the pre-emption indication is included in a dedicated downlink control information (DCI) message.

27. The apparatus of claim 16, wherein the pre-emption indication is associated with partial energy harvesting, and the pre-emption indication includes a charging rate associated with the partial energy harvesting.

28. The apparatus of claim 27, wherein the pre-emption indication further includes a modulation and coding scheme (MCS) associated with the partial energy harvesting.

29. A method of wireless communication performed by a user equipment (UE), comprising:
receiving, from a base station, a pre-emption indication associated with a scheduled transmission between the base station and the UE; and
performing energy harvesting, during the scheduled transmission, based at least in part on the pre-emption indication.

30. A method of wireless communication performed by a base station, comprising:
determining that a user equipment (UE) should perform energy harvesting during a scheduled transmission between the base station and the UE; and
transmitting, to the UE, a pre-emption indication, associated with the scheduled transmission between the base station and the UE, to trigger the UE to perform energy harvesting during the scheduled transmission.

* * * * *